United States Patent [19]
McKaig

[11] 3,950,817
[45] Apr. 20, 1976

[54] COLLAPSIBLE HANDLE FOR LAWN MOWER OR THE LIKE

[75] Inventor: Russel Marius McKaig, Bramalea, Canada

[73] Assignee: Gilson Brothers Company (Canada) Ltd., Mississauga, Canada

[22] Filed: May 2, 1975

[21] Appl. No.: 573,938

[52] U.S. Cl. .............................. 16/111 A; 403/102
[51] Int. Cl.² ......................................... B62B 3/00
[58] Field of Search ............. 16/111 A, 112, 111 R; 280/47.37 R; 403/102, 110, 101, 91, 388

[56] References Cited
UNITED STATES PATENTS

| | | | |
|---|---|---|---|
| 2,727,753 | 12/1955 | Johnson et al. | 16/111 A |
| 3,204,272 | 9/1965 | Greene et al. | 16/111 A |
| 3,423,103 | 11/1969 | Maltarp | 16/111 A |
| 3,462,924 | 8/1969 | Price et al. | 16/111 A |
| 3,527,469 | 9/1970 | Gobin | 16/112 |

Primary Examiner—Andrew V. Kundrat
Attorney, Agent, or Firm—Fetherstonhaugh & Co.

[57] ABSTRACT

A quick release clamping assembly for connecting two components at least one of which has an arcuate shaped clamping surface. The assembly consists of a stem projecting from one of the components through the other component and a clamping nut mounted on the stem. The clamping nut is rotatable with respect to the stem between the clamping-in position in which it clamps the two components together in the released position in which one component is movable with respect to the other about the stem. The clamping nut has an underside directed towards the clamping surface of the first component. The underside of the clamping nut is formed to provide a clamping surface of a concave curvature corresponding to the convex curvature of the clamping surface of the first component and a release recess angularly disposed with respect to the clamping surface and extending inwardly with respect to the nut above the clamping surface of the clamping nut. The clamping nut is mounted for rotation about the stem between a clamping position in which the clamping surface of the nut is aligned with the clamping surface of the first component and the second position in which the release recess of the nut is aligned with the clamping surface of the first component. The stem member engages the clamping nut and is of a length to apply a clamping force firmly securing the components and the clamping nut with respect to one another when the clamping nut is in a first clamping position. The recess extends inwardly of the nut to a sufficient width and depth to release the clamping force when the nut is in the second position. The assembly is sufficiently resilient to permit the clamping nut to be rotated between the clamping position and the second release position.

6 Claims, 9 Drawing Figures

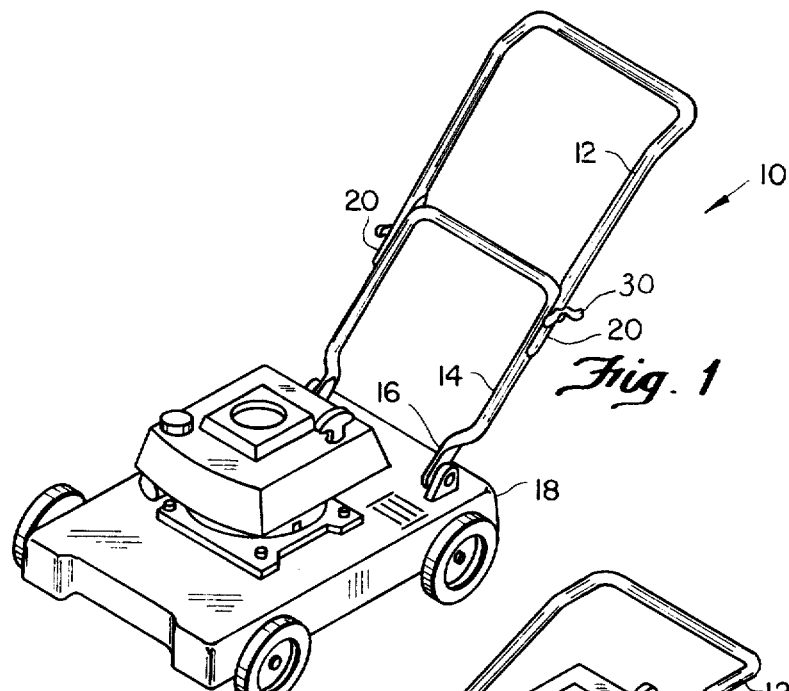
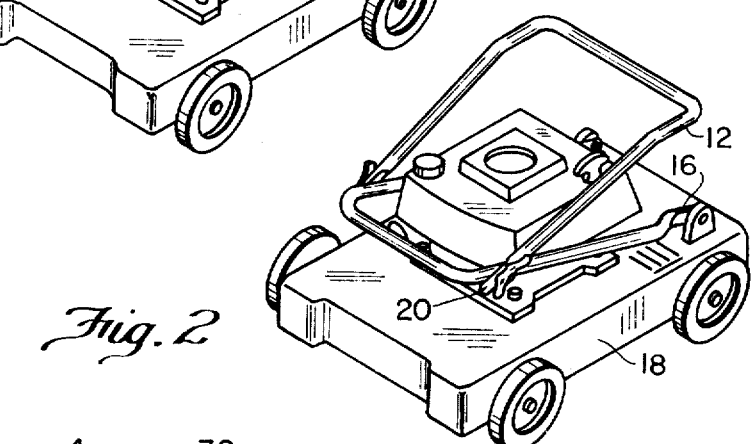
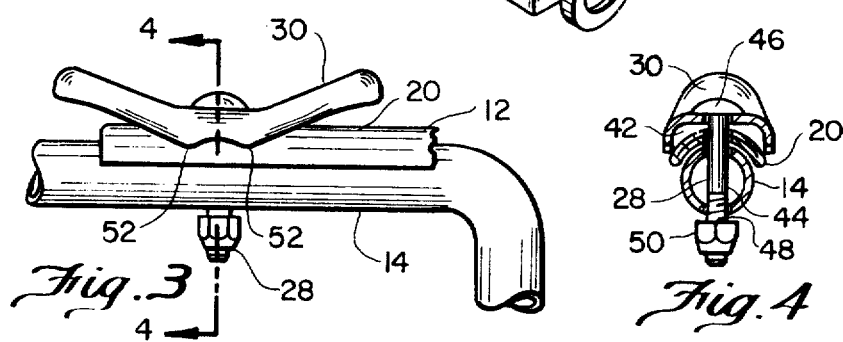
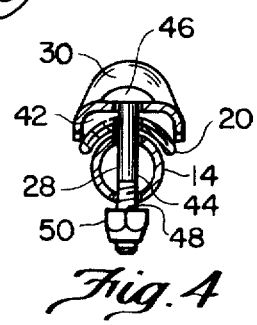
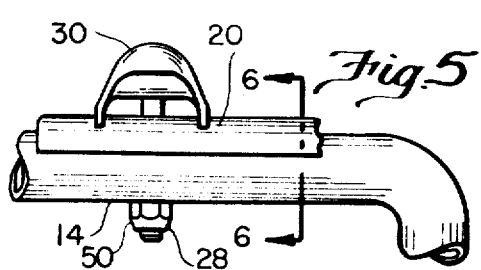
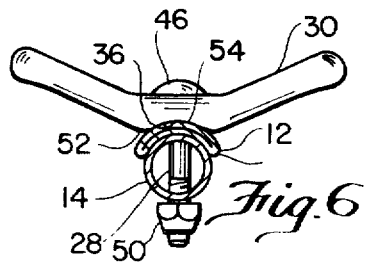

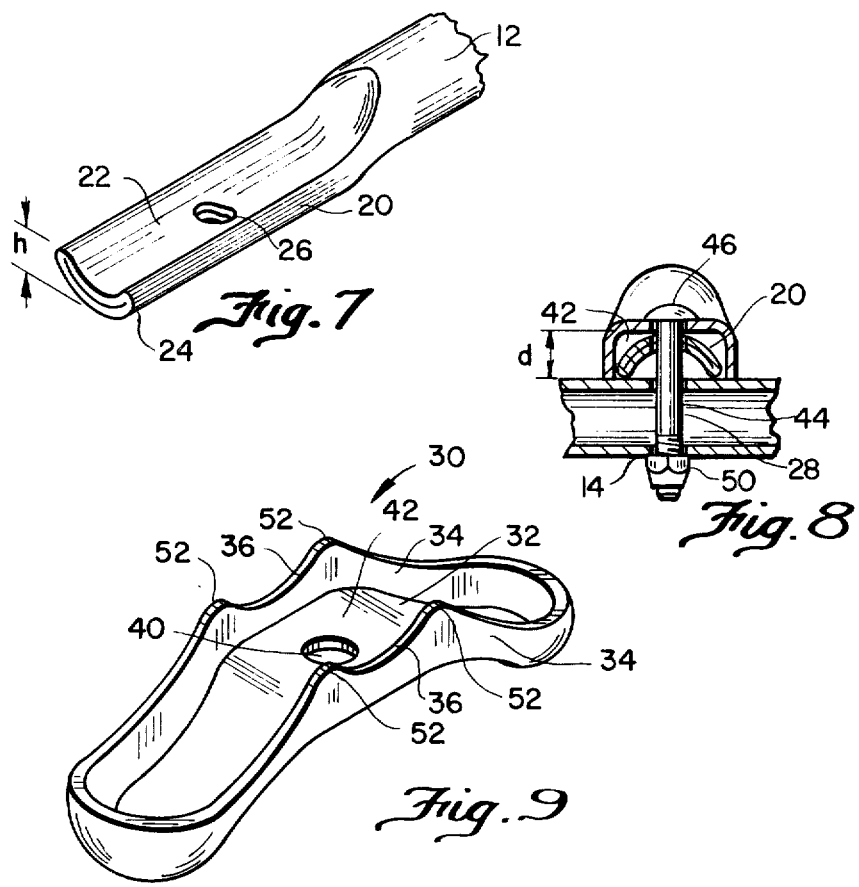

COLLAPSIBLE HANDLE FOR LAWN MOWER OR THE LIKE

FIELD OF INVENTION

This invention relates to quick release clamping assemblies. In particular, this invention relates to a quick release clamping assembly suitable for use in association with a lawn mower handle or the like to permit the handle to be folded upon itself to a compact configuration.

PRIOR ART

In the manufacture of lawn mower handles, it is common practice to make the handle of two components which are movable with respect to one another between a fully extended aligned position and a folded compact position. The provision of a folding handle in the lawn mower or other gardening appliances considerably reduces the bulk of the device for storage purposes. One of the difficulties which has been experienced to date is in providing an effective release mechanism for quickly and simply releasing the components for movement between the extended and folded positions. In many instances a simple wing-nut mechanism is employed in which the clamping force is applied by a wing-nut which is threadably mounted on a stem. The difficulty with this type of mechanism is that the nuts can be lost or misplaced during storage, the nuts may be loosened by the vibrations caused by the operation of the equipment and the nuts may become corroded and thereby bonded to the stem, making it impossible to move the nut with respect to the stem. As a result, many of the advantages which are to be derived from the folding handle structure are not, in fact, realized because the users prefer to leave the handle in the extended position rather than risk the difficulties involved in the use of the release mechanism.

SUMMARY OF INVENTION

The present invention overcomes the difficulties of the prior art described above and provides a quick release clamping assembly which is particularly suitable for use in association with a foldable lawn mower handle.

According to one aspect of the present invention, there is provided a quick release clamping assembly consisting of a first component having an arcuate shaped outer clamping surface and a second component underlying the first component. A stem member projects through the first component and has one end mounted on the second component and the other end disposed above the arcuate shaped outer clamping surface. The stem has a longitudinal axis extending between the ends thereof. A clamping nut having an underside directed towards the arcuate shaped surface of the first component is pivotably mounted on the stem. The underside of the clamping nut is formed to provide a clamping surface of a concave curvature corresponding to the convex curvature of the clamping surface of the first component and a release recess angularly disposed with respect to the clamping surface and extending inwardly with respect to the nut above the clamping surface thereof. The clamping nut is mounted for rotation about the longitudinal axis of the clamping stem between a first clamping position in which the clamping surface of the nut is aligned with the clamping surface of the first component and a second release position in which the release recess of the nut is aligned with the clamping surface of the first component. The stem member is of a length to apply a clamping force firmly securing the components and clamping nut with respect to one another when the clamping nut is disposed in the first clamping position. The release recess is of a sufficient width and depth to release the clamping force when the nut is in the second position to permit relative movement between the components. The assembly is sufficiently resilient to permit the clamping nut to be rotated between the first clamping position and the second release position.

According to a further aspect of the present invention there is provided in a lawn mower handle of the type consisting of a lower U-shaped tubular component adapted to be pivotably mounted at its free ends on a mower body and an upper U-shaped tubular component, the free ends of which are swagged to an arcuate form having an inwardly directed concave curvature and an outwardly directed convex curvature, the concave curvature being complementary to the convex curvature of the surface of the lower tubular component, the free ends of the upper tubular component being pivotably mounted in an outwardly overlying relationship with respect to the arms of the lower component adjacent the upper ends thereof, said concave curvature being alignable with the convex curvature of the lower component when the first and second components are aligned to provide the full extension of the handle, pivot stem means pivotably connecting said components with respect to one another for movement between a fully extended position and a folded position in which the components are misaligned, the improvement of a quick release mechanism for releasably clamping the components with respect to one another comprising a clamping nut pivotably mounted on each of said stems, said clamping nut having an underside directed towards the arcuate surface of the upper component, the underside being formed to provide a clamping surface of a concave curvature corresponding to the convex curvature of the upper component and a release recess angularly disposed with respect to the clamping surface and extending inwardly with respect to the nut above the clamping surface of the nut, the clamping nut being mounted on the stem for rotation about the stem between a clamping position in which the clamping surface of the nut is aligned with the clamping surface of the first component and a release position in which the release recess of the nut is aligned with the convex curvature of the upper component, the stem being of a length to apply clamping force firmly securing the components of the clamping nut with respect to one another when the clamping nut is disposed in the first clamping position, the recess being of sufficient width and depth to release the clamping force when the nut is in the release position to permit relative movement between the components, the assembly being sufficiently resilient to permit the clamping nut to be rotated between the clamping position and the release position.

PREFERRED EMBODIMENT

The invention will be more clearly understood after reference to the following detailed specification read in conjunction with the drawings wherein, FIG. 1 is a pictorial top view of a lawn mower with handle in the extended position;

FIG. 2 is a view similar to FIG. 1 showing the handle in the folded position;

FIG. 3 is a fragmentary side view illustrating the lock nut in the release position;

FIG. 4 is a sectional view taken along the line 4—4 of FIG. 3;

FIG. 5 is a fragmentary side view illustrating the lock nut in the clamping position;

FIG. 6 is a sectional view along the line 6—6 of FIG. 5;

FIG. 7 is a fragmentary pictorial view of the arcuate shaped end of a portion of the handle;

FIG. 8 is a view similar to FIG. 5 showing the handle components in the folded configuration, and FIG. 9 is a pictorial view of the underside of a lock nut.

With reference to the drawings, the reference numeral 10 refers generally to a lawn mower handle assembly which consists of an upper or first U-shaped component 12 and a second or lower U-shaped component 14, both of which are formed from a tubular material such as tubular steel or the like. The lower ends 16 of the lower component 14 are pivotably mounted with respect to the body 18 of a lawn mower in a well known manner. As shown in FIG. 7 of the drawings, the lower ends 20 of the arms of the U-shaped upper component 12 are swagged to an arcuate shaped configuration having an inner convex surface 22 and an outer concave surface 24. The inner convex surface 22 has a curvature which is complementary to the curvature of the outer surface of the lower handle component 14. A passage 26 opens through the ends 20 of the upper component.

The upper and lower components 12 and 14 are secured with respect to one another by means of a pair of locking nuts 30 and their associated nut and bolt assemblies 28. The locking nut 30 (FIG. 9) consists of a transverse body portion 32 having a pair of spaced side walls 34 projecting therefrom. A pair of arcuate shaped clamping surfaces 36 are located centrally of the length of the body. The arm portions of the nut which extend outwardly from the central portion of the body are inclined away from the central portion of the body. A passage 40 is located centrally of the central portion of the body and extends through the body. The locking nut 30 has a recess 42 located between the clamping surfaces 36. As shown in FIG. 8 of the drawings, the depth of the recess d is at least equal to the height h of the lower end portion 20 of the upper component 12.

The nut and bolt assembly 28 (FIG. 4) consists of a bolt or pin 44 having a head portion 46 and a threaded lower end portion 48. A lock nut 50 is threadably mounted on the threaded lower end portion 48. The bolt or pin 44 extends through the passage formed in the lower component 14, through the passage 26 formed in the upper component 12 and through the passage 40 formed in the nut 30. The head portion 46 engages the upper surface of the nut 30. The lock nut 50 engages the lower surface of the lower tubular component 14. The effective length of the stem 44 between the head 46 and the lock nut 50 is such as to apply a clamping force firmly securing the components and the clamping nut with respect to one another when the clamping nut is disposed in a first clamping position as illustrated in FIGS. 5 and 6 of the drawings.

In use, when the nut 30 is located in the release position illustrated in FIGS. 3, 4 and 8 of the drawings, the arcuate shaped end portion 20 of the upper portion 12 is aligned with the recess 42 so that the components 12 and 14 may be moved between the aligned position shown in FIGS. 3 and 4 of the drawings and the folded position illustrated in FIG. 8 of the drawings. In the folded position illustrated in FIG. 8 of the drawings, the arcuate shaped lower end 20 is disposed within the recess 42 of the handle.

In order to lock the assembly in the aligned position, the components 12 and 14 are moved from the folded position shown in FIG. 2 of the drawings to the aligned position shown in FIG. 1 of the drawings. In this position, the various components are located in the position shown in FIGS. 3 and 4 of the drawings. In order to lock the components in this position, the handle 30 is rotated about the axis of the pin 28 to the position shown in FIGS. 5 and 6 of the drawings. The assembly is sufficiently resilient to permit the clamping nut to be rotated between the release position and the clamping position and permits the shoulder portions 52 at the ends of the clamping surfaces 36 to rise over the upper component to arrive at the locking position illustrated in FIGS. 5 and 6 of the drawings. As will be apparent from FIG. 6 of the drawings, it is necessary for one set of shoulders 52 to rise above the apex 54 of the curvature of the upper component 12 to move between the positions shown in FIGS. 4 and 6 of the drawings. In the position shown in FIG. 6 of the drawings, the clamping surfaces 36 apply a clamping force to the upper component 12 which serves to lock the upper component 12 in a position aligned with the lower component 14 by reason of the fact that the concave surface 22 of the upper component 12 is aligned with the convex outer surface of the lower component 14.

From the foregoing it will be apparent that the locking and the release of the clamping mechanism can be achieved by the simple act of rotating the locking nut 30 through 90°.

In the embodiment of the invention described above, the nut is designed for rotation in either direction about the axis of the stem 44. This structure may be modified to limit the rotation of the nut to rotation in one direction by extending one set of shoulders 52 on diagonally opposite sides of the nut to a height which will prohibit rotation of the handle in one direction.

According to a further embodiment of the present invention, the nut may be formed with a single lever arm portion extending a substantial distance from one side of the central portion of the body rather than the wing-nut structure illustrated in the drawings.

These and other modifications will be apparent to those skilled in the art without departing from the scope of the invention.

The embodiments of the invention in which an exclusive property or privilege is claimed are defined as follows:

1. A quick release clamping assembly comprising,
   a. a first component having an arcuate shaped outer clamping surface,
   b. a second component underlying said first component,
   c. a stem member projecting through said first component and having one end mounted on said second component, the other end thereof being disposed above said arcuate shaped outer clamping surface, said stem having a longitudinal axis extending between the ends thereof, d. a clamping nut having an underside directed towards said arcuate shaped surface of said first component, said underside being formed to provide a clamping surface of a concave curvature corresponding to the convex curvature of said clamping surface of said first component and a release recess angularly disposed with respect to said clamping surface and extending inwardly with respect to said nut above said clamping surface of said clamping nut, e. said clamping nut being mounted on said stem for rotation about said longitudinal axis between a clamping position in which said clamping surface of said nut is aligned with said clamping surface of said first component and a second release position in which said release recess of said nut is aligned with said clamping surface of said first component, f. said stem member engaging said clamping nut and of a length to apply a clamping force firmly securing said components and said clamping nut with respect to one another when said clamping nut is disposed in said first clamping position, g. said recess extending inwardly of said nut to a sufficient width and depth to release said clamping force when said nut is in said second position to permit said relative movement between said components, h. said assembly being sufficiently resilient to permit said clamping nut to be rotated between said clamping position and said second release position.

2. A quick release clamping assembly as claimed in claim 1 wherein said clamping nut is formed to provide a pair of clamping surfaces disposed one on either side of said recess.

3. A quick release clamping assembly as claimed in claim 1 wherein said clamping surface is disposed at right angles to said release recess.

4. A quick release clamping assembly as claimed in claim 2 wherein said second component is a tubular member and said first component is a tubular member, one end of said first tubular member being swagged upon itself to provide a concave curvature corresponding to the curvature of said second component for alignment therewith when in a position in which the first component is to be locked with respect to the second component.

5. A quick release clamping assembly as claimed in claim 1 wherein said recess extends inwardly of said nut to a depth at least equal to the height of the arcuate shaped portion of the first component whereby the recess may accommodate the arcuate shaped component therein to permit relative rotation between the first and second components about said axis of said stem to permit holding of one component with respect to the other.

6. In a lawn mower handle of the type consisting of a lower U-shaped tubular component adapted to be pivotably mounted at its free ends on a mower body, and an upper U-shaped tubular component the free ends of which are swagged to an arcuate form having an inwardly directed concave curvature and an outwardly directed convex curvature, the concave curvature being complementary to the convex curvature of the surface of the lower tubular component, the free ends of the upper tubular component being pivotably mounted in an outwardly overlying relationship with respect to the arms of the lower component adjacent the upper ends of the lower component, said concave curvature of said upper component being alignable with the convex curvature of the lower component when the upper and lower components are aligned to provide the full extension of the handle, pivot pin means pivotably connecting the components with respect to one another for movement between a fully extended position and a folded position, the improvement of a quick release mechanism for releasably clamping the components with respect to one another comprising, a. a clamping nut pivotably mounted on each of said pivot pin means, said clamping nut having an underside directed towards said arcuate surface of said upper component, said underside being formed to provide a clamping surface of a concave curvature corresponding to the convex curvature of the upper component and a release recess angularly disposed with respect to the clamping surface and extending inwardly with respect to the nut above the clamping surface of the clamping nut, said clamping nut being mounted for rotation about said pivot pin means between a clamping position in which the clamping surface of the nut is aligned with the clamping surface of the upper component and a second release position in which the release recess is aligned with the convex surface of the upper component, the pivot pin being of a length to apply a clamping force firmly securing the components and clamping nut with respect to one another when the clamping nut is disposed in the first clamping position, the recess being of a sufficient width and depth to release the clamping force when the nut is in the second position to permit relative movement between said components, the assembly being sufficiently resilient to permit the clamping nut to be rotated between the first clamping position and the second release position.

* * * * *